United States Patent
Otsuka et al.

(10) Patent No.: US 7,521,883 B1
(45) Date of Patent: Apr. 21, 2009

(54) MOTOR CURRENT SHAPING

(75) Inventors: Shuichi Otsuka, Miyota (JP); Eric Hardt, Tempe, AZ (US)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 11/196,188

(22) Filed: Aug. 2, 2005

(51) Int. Cl.
*H02P 25/08* (2006.01)

(52) U.S. Cl. .................................. 318/254.1; 318/811

(58) Field of Classification Search ............... 318/138, 318/254, 439, 700, 599; 388/800–900
See application file for complete search history.

(56) References Cited

U.S. PATENT DOCUMENTS

| | | | | |
|---|---|---|---|---|
| 5,289,560 A | * | 2/1994 | Abney | 388/811 |
| 5,463,299 A | * | 10/1995 | Futami et al. | 318/618 |
| 6,556,461 B1 | * | 4/2003 | Khersonsky et al. | 363/41 |
| 6,611,117 B1 | * | 8/2003 | Hardt | 318/254 |
| 6,725,132 B2 | | 4/2004 | Frankel et al. | |
| 6,801,004 B2 | | 10/2004 | Frankel et al. | |
| 6,815,916 B2 | * | 11/2004 | Horng et al. | 318/138 |
| 6,830,440 B1 | | 12/2004 | Riddoch | |
| 6,940,235 B2 | * | 9/2005 | Getz et al. | 318/254 |

FOREIGN PATENT DOCUMENTS

DE 10043934 A1 * 3/2006

OTHER PUBLICATIONS

International Search Report and Written Opinion of PCT Application PCT/US06/29180, mailed Feb. 19, 2008, 10 pages total.

* cited by examiner

*Primary Examiner*—Lincoln Donovan
*Assistant Examiner*—Erick Glass
(74) *Attorney, Agent, or Firm*—Townsend and Townsend and Crew LLP

(57) ABSTRACT

A method and apparatus is disclosed for generating a drive signal that is applied to a coil in a motor. The drive signal is applied during a period (commutation period) between a commutation event and the immediately following commutation event when the coil is energized. The drive signal comprises pulses which vary over the duration of the commutation period.

13 Claims, 4 Drawing Sheets

US 7,521,883 B1

MOTOR CURRENT SHAPING

CROSS-REFERENCE TO RELATED APPLICATIONS

The present invention is related to the following commonly owned applications: U.S. application No. 09/556,717, filed Apr. 21, 2000, now U.S. Pat. No. 6,611,117 issued Aug. 26, 2003 and U.S. application No. 10/175,654, filed Jun. 20, 2022, now U.S. Pat. No. 6,801,004 issued Oct. 5, 2004, both of which are herein fully incorporated in their entirety by reference for all purposes.

BACKGROUND OF THE INVENTION

The present invention relates generally to electric motors and the management of noise produced during operation of electric motors. More specifically, the present invention relates to noise management in brushless DC (direct current) motors and in particular to shaping the signal for energizing the coils in a brushless DC motor.

The basic construction of a brushless DC motor includes a rotating permanent magnet(s) (the permanent magnet rotor) surrounded by some number of coil windings (stator coils). A current is made to flow through each of the coils in a sequential manner, thus sequentially energizing the coils. The magnetic fields created by this flow of current through the coils interacts with the magnet(s) of the rotor. Rotary motion arises by changing the current flow in the coils as the poles of the permanent magnet rotor change angular position. The process of changing the current flow is referred to as "commutation." The period of time during which a coil or coils is energized is commonly referred to as the "commutation period."

The speed of the motor is controlled by how much current is made to flow through the coil windings (energizing the coils). One method of energizing the coils is to apply a constant voltage across the coils for the duration of the commutation period. Another method of energizing the coils is to apply a series of pulses across the coils for the duration of the commutation period.

To achieve variations in rotational speed, the voltage level applied to the coils is varied. In one case, the voltage level of a constant voltage supply that is applied across the coils can be varied. Thus, maximum rotational speed can be obtained by energizing the coils with the maximum value $V_{max}$ of the voltage supply. A lower rotational speed (50%, say) can be achieved by energizing the coils with a voltage level of 0.5 $V_{max}$.

A more commonly used and power-efficient approach is to energize the coils with a pulsewidth modulated (PWM) signal. Thus, the voltage $V_{max}$ of the voltage supply is applied as a series of pulses during the commutation period. The duty cycle (ON to OFF ratio) determines the speed of the motor. For example, maximum speed calls for a 100% duty cycle, namely, always ON. A speed of 75% would call for a duty cycle of about 75% where the pulse is at $V_{max}$ for 75% of the pulse period and at ground (0 volts) for the remaining 25% of the pulse period.

FIGS. 6 and 7 show the current flow through a coil during a commutation period of duration P. FIG. 6 shows the current profile when a coil is energized by a constant voltage source. It can be seen that toward the end of the commutation period there is a current spike. This current spike is due to collapsing of the magnetic field (also referred to as the back EMF, electromotive force) in the coil when the voltage is removed at the end of commutation period.

A similar effect is seen in FIG. 7 where PWM is used to energize the coils. A similar spiking effect results at the end of the commutation period when the energizing pulses are removed toward the end of the commutation period.

These spikes can create audible noise. More significantly, the spikes can be a source of EM interference (EMI). Conventional solutions include the use of circuitry to filter the spikes resulting during operation of the fan motor, or to otherwise reduce the effects of the spikes.

SUMMARY OF THE INVENTION

The present invention provides for a method and apparatus for controlling the drive signal that is applied to a coil of a motor during a commutation period. The drive signal comprises a plurality of pulses. For the duration of the commutation period the pulses are varied, and by so doing noise reduction during operation of the motor is achieved. The present invention also provides for noise management by appropriate control of the drive signal during a commutation period when a coil is being energized by the drive signal.

BRIEF DESCRIPTION OF THE DRAWINGS

Aspects, advantages, and novel features of the present invention will become apparent from the following description of the invention presented in conjunction with the accompanying drawings, wherein.

DESCRIPTION OF THE SPECIFIC EMBODIMENTS

Although the present invention is readily adapted for any brushless DC motor arrangement, Applicant's brushless DC motor fan apparatus will serve as a convenient vehicle for describing a specific illustrative embodiment of the invention. In particular, the motor apparatus disclosed in Applicant's U.S. Pat. No. 6,611,117 will be described herein.

Figure 1:
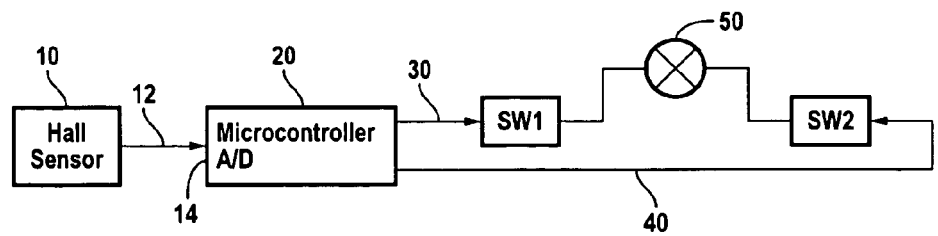
FIG. 1 shows a simplified block diagram of a brushless DC motor and controller operable according to the present invention.
Figure 2:
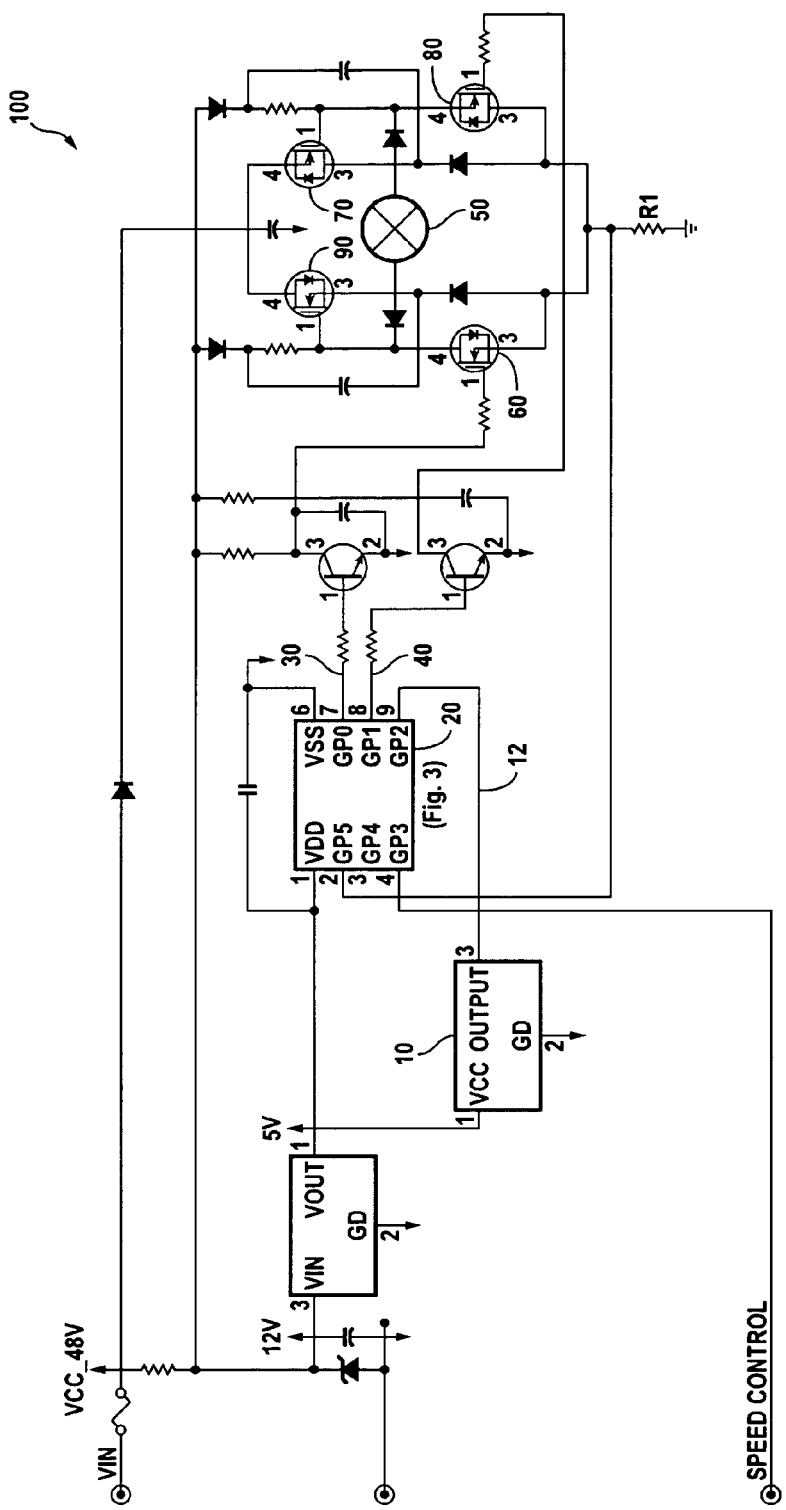
FIG. 2 shows a schematic diagram of the brushless DC motor shown in FIG. 1.

FIGS. 1 and 2 show a simplified block diagram and a schematic diagram respectively of a brushless DC motor, generally designated 100, according to an embodiment of the present invention. The motor 100 includes a Hall sensor 10 having an output 12; a microcontroller 20 having complementary outputs 30 and 40; stator coil 50; and switches SW1 and SW2. In the block diagram shown in FIG. 1, the switches SW1 and SW2 comprise the two switches that are on at the same time in a full-bridge driver stage. In the schematic diagram shown in FIG. 2, the switches SW1 and SW2 of FIG. 1 are represented by switches 60 and 70 or switches 80 and 90. In a preferred embodiment according to the present invention, the Hall sensor 10 comprises an industry part number UA3175 device and the microcontroller 20 comprises an industry part number 12C671 device.

One application for the brushless DC motor shown in FIGS. 1 and 2 is in a fan of the type used for cooling electronic circuits. Such a brushless DC fan, which is to say a fan driven by a brushless DC motor, further includes an impeller mounted in an impeller housing (not shown). As shown in FIGS. 1 and 2, the impeller of the fan is caused to rotate when current flows through the upper switch SW1 70, through the stator coil 50, and through the lower switch of SW1 60 and alternatively through the upper switch of SW2 90, through the stator coil 50, and through the lower switch of SW2 60.

The impeller housing contains a permanent magnet which constitutes the permanent magnet rotor of the brushless DC fan. The Hall sensor 10 detects a change in the state of the magnetic field that is produced as the impeller (and hence the permanent magnet rotor) of the brushless DC fan rotates. As the impeller reaches a rotational extreme, the Hall sensor 10 detects the change in the state of the magnetic field of the brushless DC fan, and the output 12 of the Hall sensor changes its logic state. For discussion purposes below, this event is referred to as a Hall interrupt.

The output 12 of the Hall sensor 10 is provided to the microcontroller 20, and the state of the outputs 30 and 40 of the microcontroller 20 is a function of the output 12 of the Hall sensor 10. Thus, according to an embodiment of the present invention, whenever the microcontroller 20 senses a change in the output 12 of the Hall sensor 10, the microcontroller 20 changes its outputs 30 and 40 in accordance with the present invention. Additional detail of the operation of the microcontroller 20 is discussed in the flow chart of FIG. 3. It will be appreciated by those having skill in the art that the particular relationship between the state of the outputs 30 and 40 of the microcontroller 20 and the output 12 of the Hall sensor 10 can be suitably adapted to conform to the requirements of any given brushless DC motor or fan.

Figure 3:
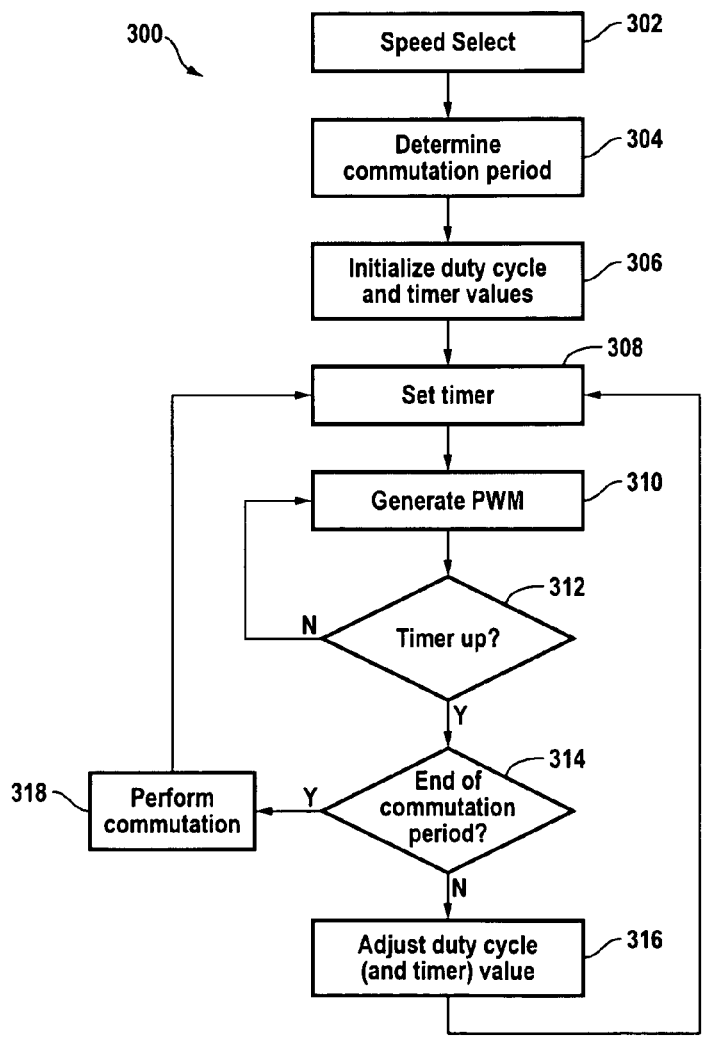
FIG. 3 shows a flowchart describing the commutation of the brushless DC motor shown in FIGS. 1 and 2 in accordance with the present invention.

FIG. 3 explains the operation of the motor 100 in accordance with the embodiment of the invention as shown in FIG. 2. More specifically, according to an embodiment of the present invention, the microcontroller 2 changes the state of its outputs 30 and 40 in accordance with software program instructions that it executes according to techniques that are well-known in the art and which will not be described further herein. In an embodiment of the present invention, the microcontroller 20 effects commutation of the brushless DC motor by executing software program instructions in accordance with steps highlighted by the flowchart 300 shown in FIG. 3.

FIG. 3 shows the functioning of the microcontroller 20 according to a specific embodiment of the present invention. In a step 302, a speed selection is performed. In a typical computer fan configuration, the system in which the computer fan is operated provides its own PWM drive signals (also referred to as an external or a system-provided PWM drive signal, with respect to the fan) for operating the fan motor. The duty cycle of the system-provided drive signals controls the fan speed. In the present invention, the microcontroller 20 detects the system-provided drive signals and can ascertain the desired fan speed operation based on the duty cycle of the incoming drive signals. Of course, it will be appreciated that any of numerous alternative techniques can be used to select the speed of the motor. For example, a data interface can be provided wherein the external system within which the motor is operated can send digital information that indicates motor speed.

In a step 304, the commutation period is determined based at least on the speed selection. The physical dimensions of the motor can be made available to the microcontroller 20. The commutation period can be readily computed based on the speed selection (e.g., revolutions per minute), the physical dimensions (e.g., rotor diameter) and design parameters of the motor (e.g., number of poles). The commutation period indicates the amount of time one or more of the stator coils will be energized before a commutation must be performed.

Figure 5A:
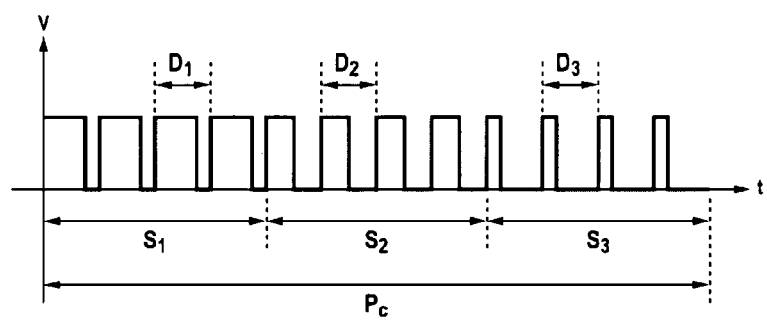
FIGS. 5A-5C illustrate examples of drive signal waveforms for energizing a stator coil according to the present invention.

In a step 306, the microcontroller 20 selects an initial duty cycle value and a timer value. Here, the commutation period determined in step 304 can be divided into two or more sub-periods. For example, in one specific embodiment of the invention, the commutation period is divided into three sub-periods of time as shown in FIG. 5A. The figure shows three sub-periods of duration $s_1$, $s_2$, and $s_3$. However, it will be understood that the commutation period can divided into more (or fewer) numbers of sub-periods. The sub-periods may be of different durations (see for example, FIG. 5B). A timer value is selected corresponding to the first sub-period. Also, an initial duty cycle value is selected or otherwise determined.

In a step 308, the microcontroller 20 sets a timer with the initial timer value determined in step 306. Then, in a step 310, the microcontroller 20 generates a pulse having a duty cycle equal to, or at least based on, the initial duty cycle value from step 306.

In a decision step 312, if the timer that was set in step 308 times out, then the processing proceeds to another decision step 316. The timer running out signifies the end of a commutation sub-period. A determination is made in step 314 whether the last sub-period has expired. A suitable counter or some other similar mechanism can be used to keep track of information relating to the number of commutation sub-periods and which sub-period is in effect and other such information that might be needed. If a determination is made that the last sub-period of the commutation period has expired, then a commutation is performed in a step 318. Expiration of the last sub-period signifies that the commutation period has ended and that a commutation should be performed.

If the sub-period is not the last commutation sub-period (i.e., the NO leg of the decision step 314), then processing continues to a step 316. Here, a new or adjusted duty cycle value is selected for pulses generated during the next commutation sub-period. In accordance with an embodiment of the present invention, the new duty cycle value is reduced by some amount from its previous value. For example, in a specific embodiment, the new duty cycle is the previous duty cycle less one-quarter of the initial duty cycle; thus, $$D_{new} = D_{previous} - 0.25 \times D_{initial}.$$

In addition to adjusting the duty cycle for the next commutation sub-period, the timer value for the next sub-period may need to be adjusted. In the case where each commutation sub-period is equal in duration, the timer value need not be reset. However, as discussed above, an embodiment of the present invention may use sub-periods of varying duration. In that case, the timer value would have to be reset for duration of the next commutation sub-period.

From step 316, processing continues by returning to step 308. There, the timer is reset, possibly with a new timer value, and processing proceeds as discussed above with the adjusted duty cycle value. Thus, steps 308 to 316 are repeated for each commutation sub-period. It can be seen then that during the commutation period, the duty cycle varies. By appropriate selection of duty cycle values, the noise created due to the back EMF in a stator coil at the end of the commutation period can be substantially reduced.

Figure 4:
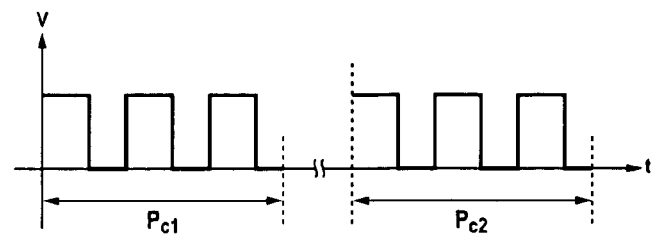
FIG. 4 shows conventional drive signals for energizing a stator coil.
Figure 5B:
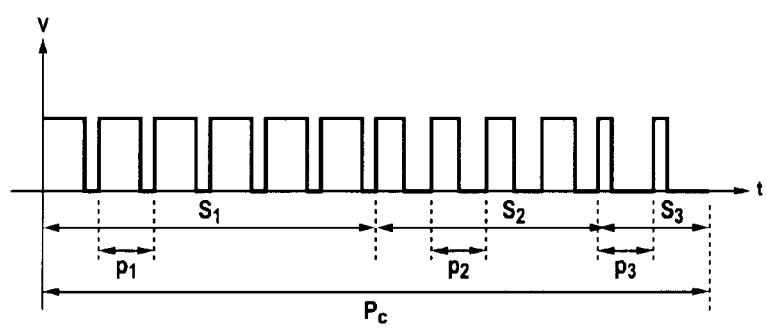

Refer now to FIGS. 4, 5A, and 5B. These figures show the voltage profile across a stator coil in a motor. FIG. 4 shows conventional PWM drive signals applied to a coil. During a first commutation period $P_{c1}$, the drive signal comprises some number of pulses (the figure shows three) of a given duty cycle are applied to the coil. Then at a later time, during another commutation period $P_{c2}$, another drive signal comprising a second set of drive pulses is applied to the coil. As understood of the prior art, the duty cycle of the pulses comprising the drive signal during the commutation period is essentially constant.

However, in accordance with the present invention, the duty cycle of the pulses vary for the duration of the commutation period. FIG. 5A shows an illustrative example of this aspect of the present invention. The figure shows, on an expanded time scale, the drive signal for energizing the coil during a single commutation period of duration $P_c$, and the pulses comprising the drive signal. The commutation period is shown divided into three sub-periods, each of duration $s_1$, $s_2$, and $s_3$. The pulses applied to the coil during the first sub-period ($s_1$) near the beginning of the commutation period have a duty cycle of $D_1$. The pulses applied to the coil during the second sub-period ($s_2$) have a duty cycle of $D_2<D_1$. Finally, the pulses applied to the coil during the third sub-period ($s_3$) toward the end of the commutation period have a duty cycle of $D_3<D_2$. That is, the duty cycle varies during the commutation period.

FIG. 5A shows that the sub-periods are of equal duration; thus, $s_1=s_2=s_3$. FIG. 5B shows that a commutation period can be divided into sub-periods of unequal duration where, for example, $s_1 \neq s_2 \neq s_3$. In addition, FIGS. 5B and (5A) shows that the pulse durations ($P_1$, $P_2$, $P_3$) of the pulses are equal.

In an initial implementation of the present invention, the commutation period was divided into four sub-periods. The duty cycle of the pulses in a subsequent sub-period was reduced by ¼ of the original duty cycle value. The final pulse in the last sub-period was eliminated. From the foregoing, it can be appreciated that the present invention teaches that constituent pulses of the drive signal applied to a stator coil during the commutation period can be varied in many ways.

For example, the commutation period can be divided into any number of sub-periods. Each sub-period can be of equal duration, or each sub-period can be of different duration. The microcontroller 20 can be programmed using known programming techniques to implement this aspect of the present invention.

The microcontroller 20 can be programmed to gradually decrease the duty cycle of the constituent pulses of the drive signal over the duration of the commutation period. Thus, pulses near the beginning of the commutation period can have duty cycles that are greater than the duty cycle of pulses toward the end of the commutation period. In general, the duty cycle of the constituent pulses of the drive signal applied to a stator coil during a commutation period can be varied.

Figure 5C:
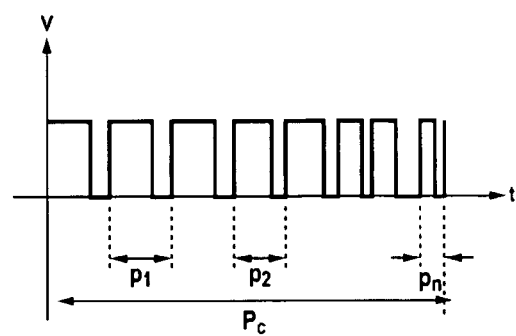
Figure 6:
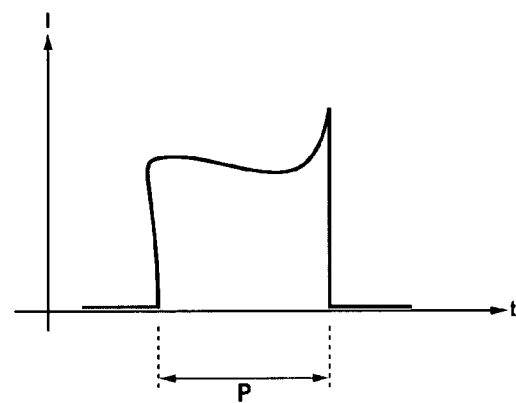
FIG. 6 shows the current profile across a coil that is energized according a conventional technique.
Figure 7:
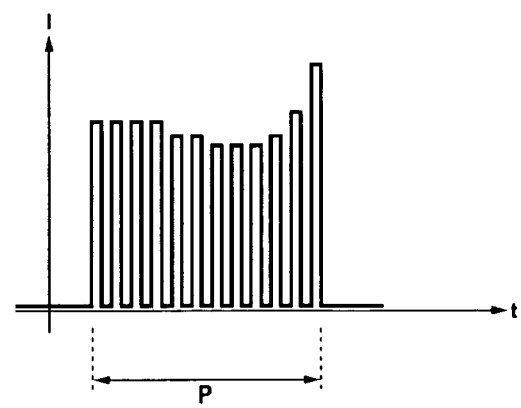
FIG. 7 shows the current profile across a coil that is energized according to another conventional technique.

Instead of varying the duty cycles, the periods of the constituent pulses (pulse periods) can be varied during the commutation period. The duty cycles of the period-varying pulses can be maintained at a constant duty cycle. FIG. 5C shows this aspect of the present invention, wherein the periods $p_1$ to $p_n$ may be different. Alternatively, both the period and the duty cycles of the pulses can be varied over the course of the commutation period.

In a conventional system, when a given motor speed is desired, the duty cycle of the drive signal is appropriately selected and applied to a coil during the commutation period for that coil. In other words, during the time which a coil is being energized, the constituent pulses of the drive signal applied to that coil have a duty cycle determined based at least on the desired speed setting. The duty cycle is selected so that the average voltage that is applied across the coil for the duration of the commutation period equals a value corresponding to the desired motor speed.

It is noted that the same constraint applies in the drive signals produced according to the present invention. According to the present invention, the constituent pulses are varied in terms of their duty cycles, number of sub-periods, the pulse period, or some combination of these parameters for the duration of the commutation period. However, the parameters for selecting the variation of the duty cycle and/or the pulse period should be selected with the constraint that the total average voltage during the commutation period is appropriate for the desired rotational speed of the motor.

A noise management regime can be provided by operating the motor according to the present invention. Noise generated by the motor during operation can be reduced by driving the stator coils in accordance with the present invention. That is, for each stator coil, when that stator coil is driven during its commutation period, the driving signal is generated in accordance with the present invention and applied to that coil. The reduction of the back EMF results in a corresponding reduction in noise and EMI.

What is claimed is:

1. A method for driving a motor comprising generating a drive signal to energize a coil comprising said motor for operating said motor at a desired rotational speed, and energizing said coil with said drive signal during a first commutation period, wherein said generating a drive signal includes a step of generating a first plurality of pulses having a first duty cycle followed by step of generating a second plurality of pulses fewer in number than said first plurality of pulses and having a second duty cycle less than said first duty cycle, the second plurality of pulses occurring at the end of said first commutation period.

2. The method of claim 1 wherein said generating a drive signal further comprises a step of generating a third plurality of pulses subsequent to said step of generating a first plurality of pulses and prior to said step of generating a second plurality of pulses.

3. The method of claim 2 wherein said third plurality of pulses have a third duty cycle less than the first duty cycle and greater than the second duty cycle.

4. The method of claim 1 wherein said motor is a brushless DC motor.

5. The method of claim 1 wherein said motor is a incorporated in a fan.

6. A fan comprising a motor and a controller to generate drive signals to operate said motor, said controller operable to generate drive signals according to the method of claim 1.

7. A method for managing noise generated during operation of a fan, said fan comprising a brushless DC motor, the method comprising generating drive signals to energize stator coils that comprise said brushless DC motor, said drive signals operating said motor at a given rotational speed, wherein said generating drive signals includes, for a first commutation period, generating a first plurality of pulses having a first duty cycle followed by step of generating a second plurality of pulses fewer in number than said first plurality of pulses and having a second duty cycle less than said first duty cycle, the second plurality of pulses occurring at the end of said first commutation period.

8. The method of claim 7 wherein said generating drive signals for said first commutation period further comprises a step of generating a third plurality of pulses subsequent to said step of generating a first plurality of pulses.

9. A method for operating a fan motor comprising energizing a coil of said fan motor during a first commutation period to operate said fan motor at a given rotational speed, including generating a plurality of pulses during said first commutation period, including generating a first plurality of pulses having a first duty cycle followed by step of generating a second plurality of pulses fewer in number than said first plurality of pulses and having a second duty cycle less than said first duty cycle, the second plurality of pulses occurring at the end of said first commutation period.

10. The method of claim 9 wherein said motor is a brushless DC motor.

11. A fan comprising a fan motor and a controller to generate drive signals to operate said fan motor, said controller operable to generate drive signals according to the method of claim 9.

12. A brushless DC motor comprising:

a plurality of stator coils;

means for generating a pulse-width-modulated (PWM) signal to energize a first coil among said plurality of stator coils during a first commutation period for operation of said DC motor at a desired rotational speed, the duration of said PWM signal being substantially equal to said first commutation period, said PWM signal comprising a plurality of first pulses and a plurality of second pulses fewer in number than said first pulses and having a duty cycle shorter than a duty cycle of said first pulses, said second pulses occurring at the end of said commutation period; and means for energizing said first coil during said first commutation period by applying said PWM signal thereto.

13. The motor of claim 12 as incorporated in a fan.

* * * * *